April 28, 1936.  H. HAUPT  2,038,932
TRAILER TOOL CART
Filed March 2, 1932  2 Sheets-Sheet 2
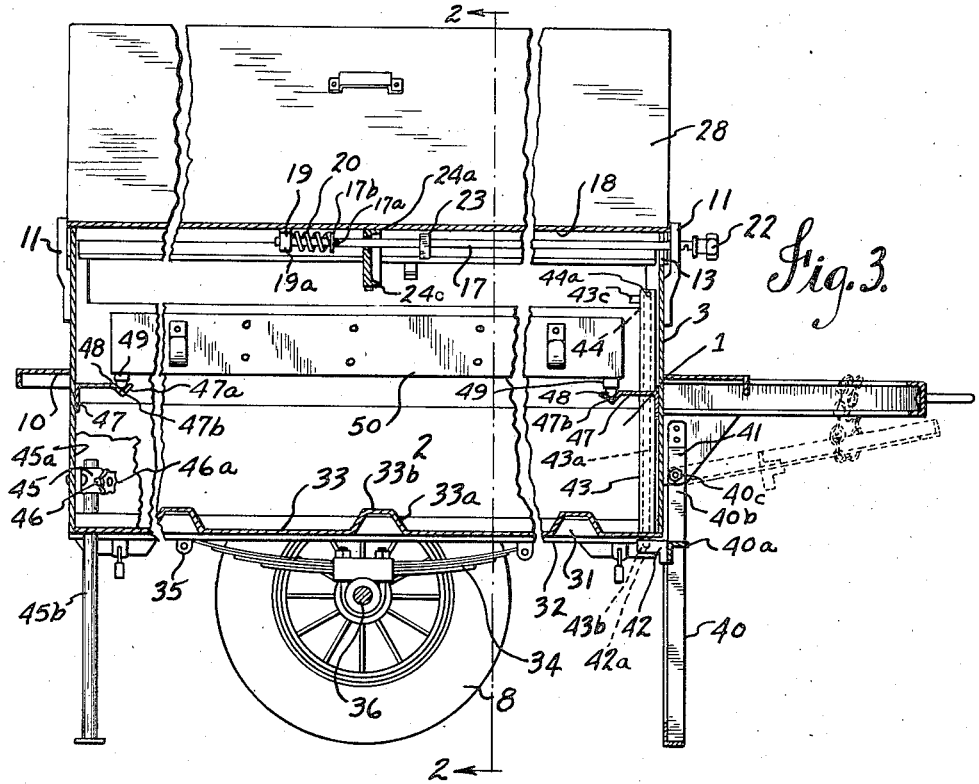
Fig. 3.
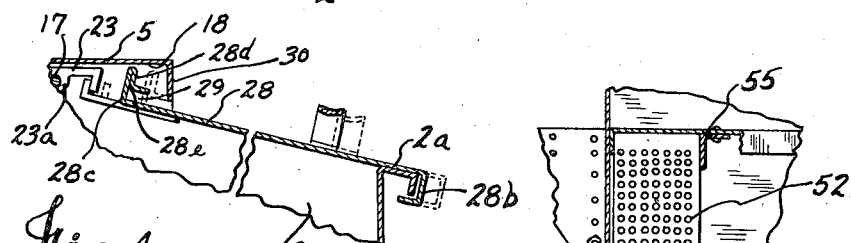
Fig. 4.
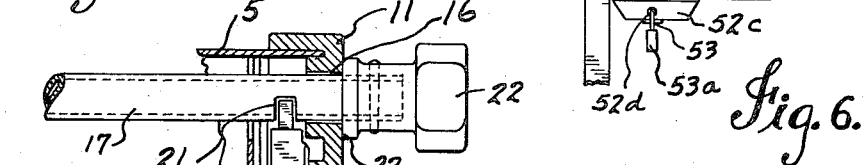
Fig. 5.  Fig. 6.
INVENTOR.
Herbert Haupt
BY
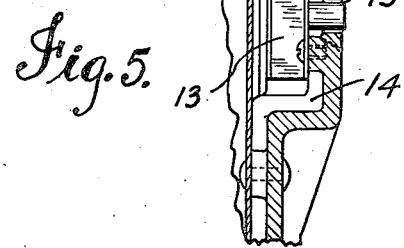
ATTORNEYS Patented Apr. 28, 1936

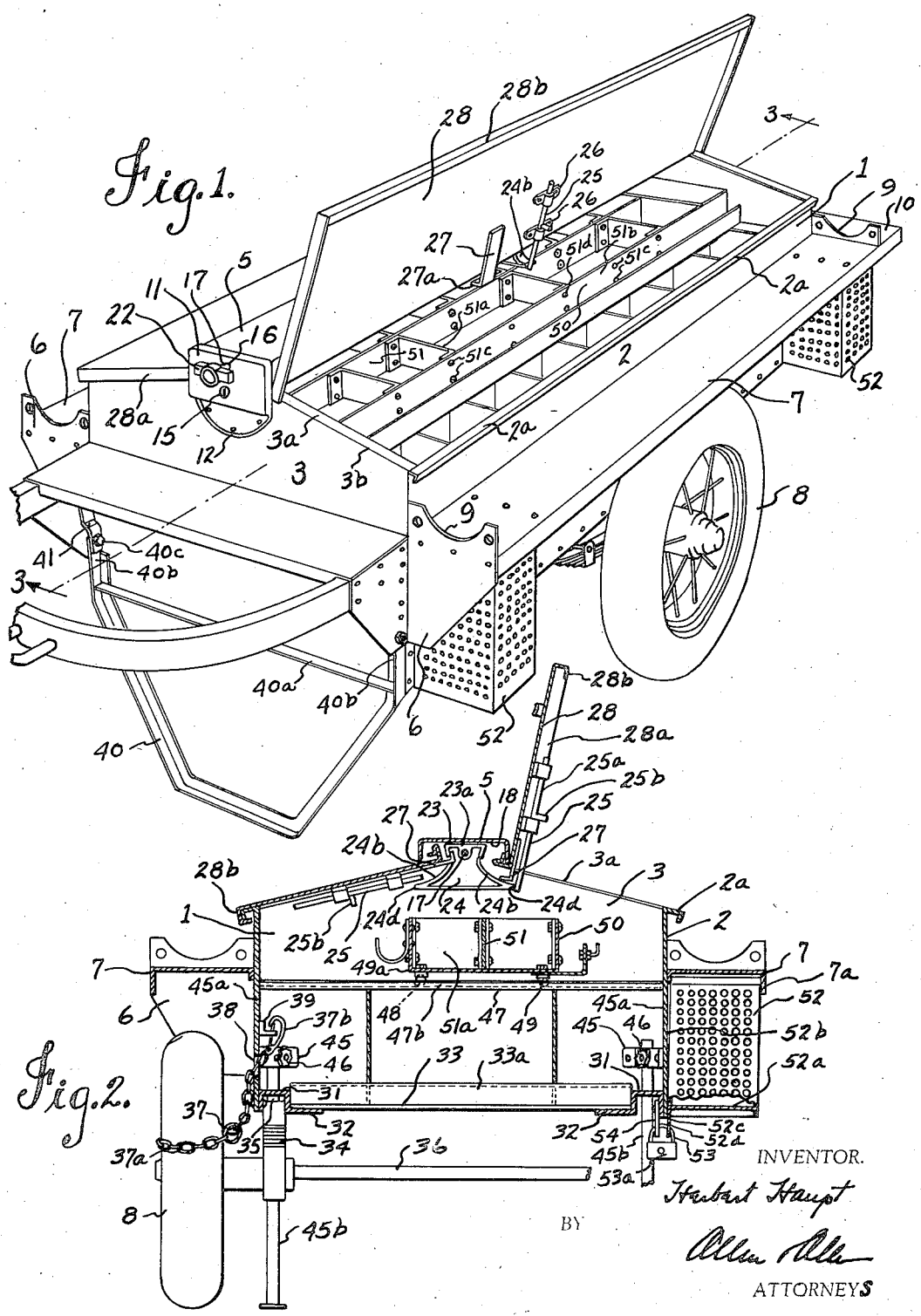

2,038,932

UNITED STATES PATENT OFFICE 2,038,932

TRAILER TOOL CART

Herbert Haupt, Mount Healthy, Ohio, assignor to Littleford Brothers, Cincinnati, Ohio, a co-partnership comprising John S. Littleford, Thomas S. Littleford, Roger S. Littleford, John S. Littleford, Jr., and Bernice L. Wadsworth Application March 2, 1932, Serial No. 596,324

6 Claims. (Cl. 296—24)

My invention relates to trailer carts used by repair and maintenance crews on road and field work.

While tool carts of the general design of my cart have been in common use, ordinarily such carts have hinged lids. If hinged lids are swung up and supported by a wooden or metal piece and a laborer accidentally dislodges the piece, the lid bangs down, crushing his hands, arms or head. Thus an object of my invention is to provide a lid which, when in elevated position, can be automatically locked without a brace under the lid.

Tool carts of this general class have also had devices for supporting red lanterns, but to the best of my knowledge and belief no theft-proof compartments have been arranged for the lanterns, or guards provided to prevent their being broken by stones thrown at them. Another object is, therefore, to provide lantern compartments which will be protected and prevent removal of the lantern.

To prevent the carts from being wheeled away or moved to dangerous places, as by revellers on Halloween, it is further an object to provide stands at each end of the cart with locking devices arranged to lock them in position, where one or the other will dig into the ground and so block its movement.

Specifically, it is an object of my invention to provide a trailer cart body having covers which are secured, without hinges, along their entire lengths and sides when they are locked by a single bolt. Another object is to provide a ventilated body for a trailer tool cart and to have the supports for the cart, while stationary, prevent the moving of the cart, and to lock the supports within the covers of the body. It is my object to provide a lantern guard attachable to the body of my trailer tool cart in such a manner that the lantern can be removed from the guard without disturbing the interior of or opening the body.

Another specific object of my invention is to provide a gravitationally-actuated means for latching the covers in open position upon the raising of the covers, and thereby eliminate the possibilty of the cover closing from its own weight.

A still further object of my invention is to provide a trailer tool cart with a body having internal movable trays arranged so that the partitions of the trays are interchangeable to give variable sizes of bins within the trays. The trays are suspended in such a manner that they can be easily moved without binding in the ways supporting them.

It is my object to construct the legs supporting the cart when not in transit so that they may be locked from the inside of the box and therefore be inaccessible when the covers are locked to prevent the movement of the cart. Further, the shelving arrangement on all four sides is such that it acts as reinforcement and also guards for the wheels, thereby utilizing the same amount of material for dual purposes.

These and other objects will be more specifically pointed out in the specifications and drawings illustrating a preferred embodiment of my invention.

In the drawings:—

Figure 1 is a perspective of my trailer tool cart.

Fig. 2 is a sectional view taken on the line 2—2 of Fig. 3.

Fig. 3 is an elevation in longitudinal section taken on the line 3—3 of Fig. 1.

Fig. 4 is a fragmentary section of a cover showing the method of flanging the ends in order to secure them over their entire length.

Fig. 5 is a fragmentary view showing the method for mounting the lock and rod that latches the covers.

Fig. 6 is a fragmentary section showing the method of supporting the lantern guard.

I have shown a main body portion 1 with sides 2 and ends 3. The top edges 2a of the sides are bent over into U-shape, as shown in Figs. 1 and 4. This U-shape extends the entire length of the sides. The top edges 3a of the ends have flanges 3b and slope upwardly towards a central inverted box-like portion 5. End brackets 6, secured to the sides 2 of the body, support channel-shaped shelves 7, provide working benches, and also serve as mud guards for wheels 8. The brackets 6 have concave portions 9 for carrying round articles while the cart is in transit. The two side shelves are tied together by an end shelf 10, and together they reinforce the box.

The central box-like portion is supported by end plates 11 secured to the ends of the box by rivets 12. One of these end plates has a lock 13 secured to it within a pocket 14 provided by the shape of the plate. The lock is inaccessible except for the insertion of the key through a hole 15 in the face of the plate. A hole 16 for slidably supporting a rod 17 is also provided in the plate.

On the under side 18 of the box-like portion is secured a bearing block 19 for slidably mounting the rod 17. The rod has a pin 17a fixed in it, against which a washer 17b abuts. A compression spring 20, placed between the washer and a face 19a of the bearing block, presses the rod to the right, as shown in Fig. 3. A slot 21 is provided for the bolt of the lock and holds the rod against the action of the spring when the covers of the box are locked. A handle 22 for moving the rod is provided on the outer end, and its base 22a limits the movement to the left, as illustrated, by contact with the face of the plate. Fixed to the rod is a channel-like latch member 23, by means of a pin through a boss 23a integral with the channel-like latch member.

On the under side 18 of the box-like portion another bracket 24 is fixed by its top surface 24a. The bracket has two concave sides 24b upon which the ends of bolts 25 ride while the covers are raised and lowered. At the bottom end 24c, continuous with the concave surfaces, is a vertical surface 24d, against which the bolts press to hold the cover in open position.

The bolts 25 consist of a shank 25a slidably mounted in bearings 26, that are fixed on the under sides of the covers. A handle 25b for releasing the bolts is fixed in the shank 25a. Fixed to the under side of the cover is an L-shaped member 27, the upturned leg 27a of which is positioned to hook around the channel-like member 23 on the rod.

The covers 28 have end flanges 28a and U-shaped side flanges 28b adapted to hook around the U-shaped flange on the box. The side opposite to the U-shaped flange has an upwardly extending portion 28c perpendicular to the top surface of the cover, as shown in Fig. 4. The continuation 28d of this side is formed into an L folded back against the side 28e of the extension. The L-shaped part, however, is considerably shorter so as to form an elongated channel 29 along the entire length of the cover. This channel 29 coacting with the depending sides 30 of the box like member and the cover 28 resting on the body ends 3 replaces the conventional type of hinges.

The bottom of the box consists of two inverted channel side members 31, with horizontally inwardly disposed flanges 32 for supporting a corrugated base panel 33. The side members are riveted or welded to the sides of the box and the base panel is welded to the extending flanges. The corrugations 33a in the base panel are inverted channels high enough to extend above the tops of the side members 31, and thereby provide a ventilating opening 33b around the ends of their tops to permit the evaporation of water that may get into the box.

The running gear consists of springs 34, attached to shackles 35, which are mounted in the channels of the side members 31. A shaft 36 is fixed to the spring and on it are rotatably mounted rubber-tired wheels 8. The wheels are locked from rotation by means of a chain wound around the rim and tire. One end of the chain has a link 37 large enough to permit the passage of the chain links 37a through it, and the other end has a snap catch 37b, which passes through a hole 38 in the side of the box. An L-shaped bracket 39, with a hole 39a, receives the snap catch and holds the chain against any pull applied. The snap catch is accessible only when the covers are open.

The front leg of the trailer consists of an angle iron frame 40, with a cross tie bar 40a. The frame is pivotally mounted at the top 40b on a bolt 40c secured in a depending bracket 41 fixed to the box. On the cross bar of the leg, centrally located, is fixed an L-shaped member 42, with a hole 42a. Inside of the box and in line with the hole 42a is a vertical tube 43, in which is slidably mounted a bolt 43a. The bolt has a pointed bottom end 43b for easy entrance in the hole in the L-shaped member on the leg, and its top end 43c is bent to provide a handle. A slot 44 in the tube prevents the turning of the bolt when its end is in the hole of the L-shaped member. Hole 44a in the tube for a cotter pin prevents raising of the bolt when it is desired to lock the leg.

A bearing 45, fixed on the inner side 45a of the box, slidably supports legs 45b at the rear of the trailer. A lock screw 46 with a hand-wheel 46a holds the leg in a set position when the trailer is at rest, and also holds the leg up while the trailer is in motion.

Extending from the sides of the box are two angle brackets 47. The ends 47a of these brackets have ways 47b for balls 48 of casters 49, which are fastened to the four corners 49a, of a tool tray. These casters are the standard ball type, and need no specific description.

The tool tray 50 comprises longitudinal panels 51 and laterally disposed panels 51a. The sides 51b of the tray have holes 51c for bolts 51d that secure the inner panels of the tray to the sides. The panels are so arranged that they may be removed or secured in various locations to the sides of the tray, and thereby provide variable sizes of bins within the tray. The tray, as has been described, is movable on the casters supporting them on the ways without binding, regardless of the point of application of the force applied to move the tray.

A perforated metal box 52, with an open top and closed bottom 52a, provides a lantern guard. The back 52b has an extension 52c with a hole 52d for the staple 53 of a lock 53a. Fixed to the box is a strip 54, with a hole 54a for the staple of the lock and this hole is in line with the hole in the extension of the lantern guard. The lamp guard is held in place by the lock and angle 55 fixed to the under side of the side shelf and a flange 7a of the shelf. A separate key will be provided to a watchman or person in charge, and this method of mounting makes it unnecessary for anyone wishing to remove the lamp from entering the box to do so.

Having thus described my invention, what I claim as new and desire to secure by Letters Patent, is:—

1. In a cart body comprising side and end walls, a fixed cover member extending from one end wall to the other and having an engaging element depending toward but spaced up from said end walls, said side wall having a laterally outwardly extended element, and a movable cover member having means to hook under said outwardly extended element or to pass from thereunder by movement of the cover member laterally outward, said cover member extending under said fixed cover member and having a hook element opening toward the depending engaging element to limit the unhooking laterally outward movement of the cover member, said cover member, when unhooked, being tiltable upwardly on said end walls, and having its hook element hooking under said depending engaging means.

2. In a cart body and cover combination as set forth in claim 1, a fixed abutment under the depending engaging means of the fixed cover member, and an engaging member movable on the under side of the movable cover member to engage said abutment for holding said movable cover member in its upwardly tilted position.

3. In a cart body and cover combination as set forth in claim 1, a locking projection on said movable cover member under said fixed cover member, and locking means movably mounted in the body and accessible outside one end thereof for movement, intercepting said projection when moved to one position, to prevent the laterally outward unhooking movement of the movable cover member, and out of the path of said projection when moved to another position.

4. In a cart body and cover combination as set forth in claim 1, a fixed abutment under the depending engaging means of the fixed cover member, an engaging member movable on the under side of the movable cover member to engage said abutment for holding said movable cover member in its upwardly tilted position, a locking projection on said movable cover member under said fixed cover member, and locking means movably mounted in the body and accessible outside one end thereof for movement, intercepting said projection when moved to one position, to prevent the laterally outward unhooking movement of the movable cover member, and out of the path of said projection when moved to another position.

5. In a cart body comprising side and end walls, an inverted channel member extending from one end wall to the other with the lower edges of its flanges spaced up from the tops of said end walls, said side walls having laterally outwardly extending flanges along their tops, and covers slidable laterally on the tops of said end walls, each having a downwardly and inwardly extending flange hooking under the respective side wall flanges when the cover is slid inward, and each cover extending under said channel member and having an upwardly and outwardly projected flange thereunder, abutting the respective flange of the channel member to limit the lateral outward sliding of the cover, each cover, when slid outwardly and unhooked, being tiltable upwardly on said end walls and hooking its upwardly and outwardly extended flange under the respective flange of said inverted channel.

6. In a cart body and cover combination as set forth in claim 5, upwardly extended locking projections on the inner edges of the respective covers, and a bar extending through one end of the body and longitudinally slidable therein, having downwardly extended locking projections intercepting the respective upwardly extended cover projections when the bar is slid to one position, to prevent the outward sliding and unhooking of the respective cover, and out of the path of said cover projections when the bar is slid to another position.

HERBERT HAUPT.